Feb. 10, 1953     W. I. SMITH     2,627,848
LIGHT WEIGHT ROTARY FLUID METER AND REGISTER DRIVE ASSEMBLY
Filed Jan. 14, 1947     3 Sheets-Sheet 2
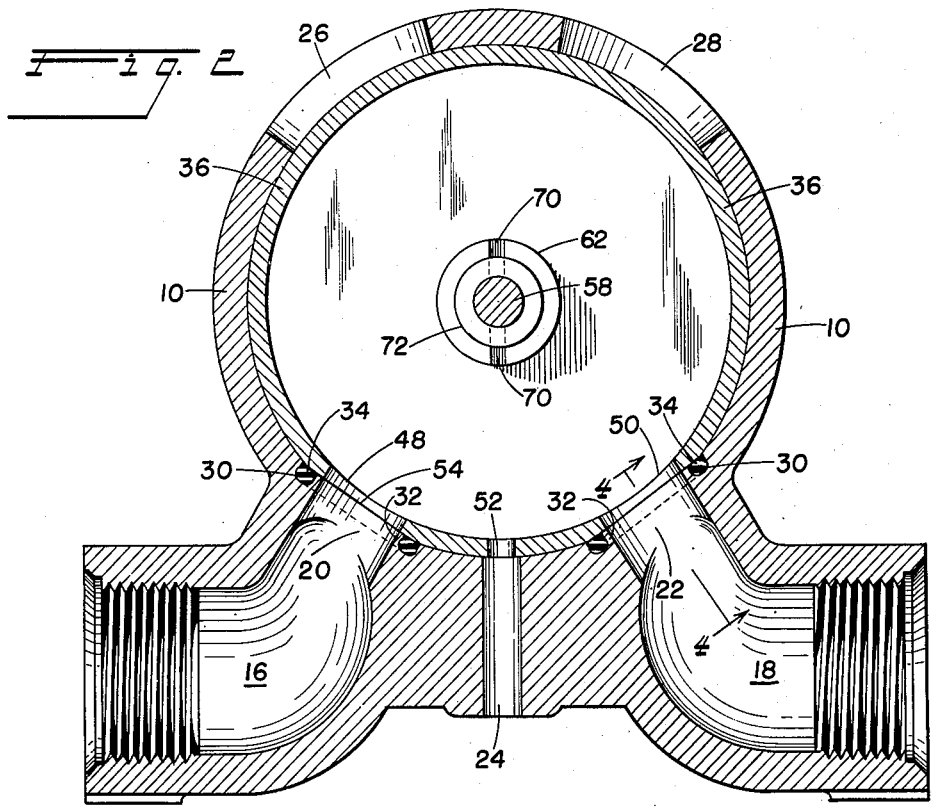
INVENTOR.
William I. Smith
BY Strauch & Hoffman
attorneys

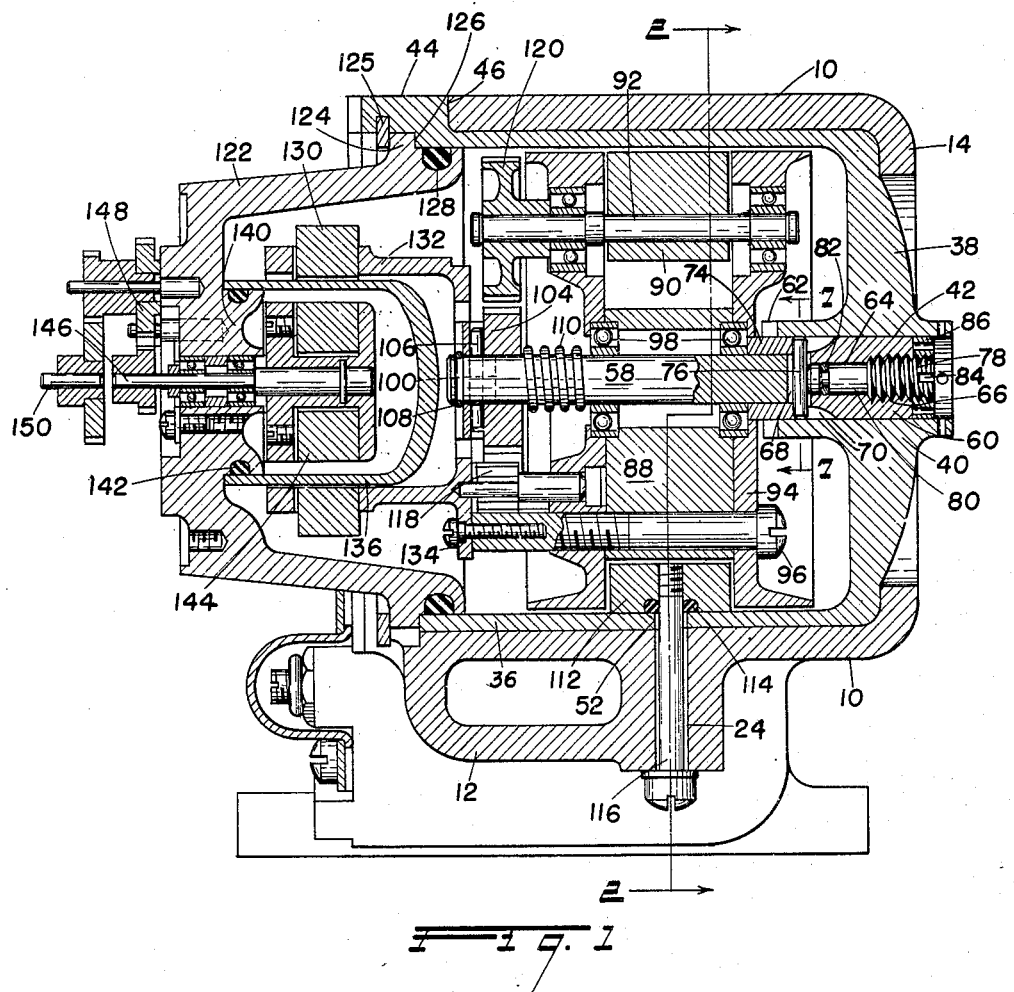

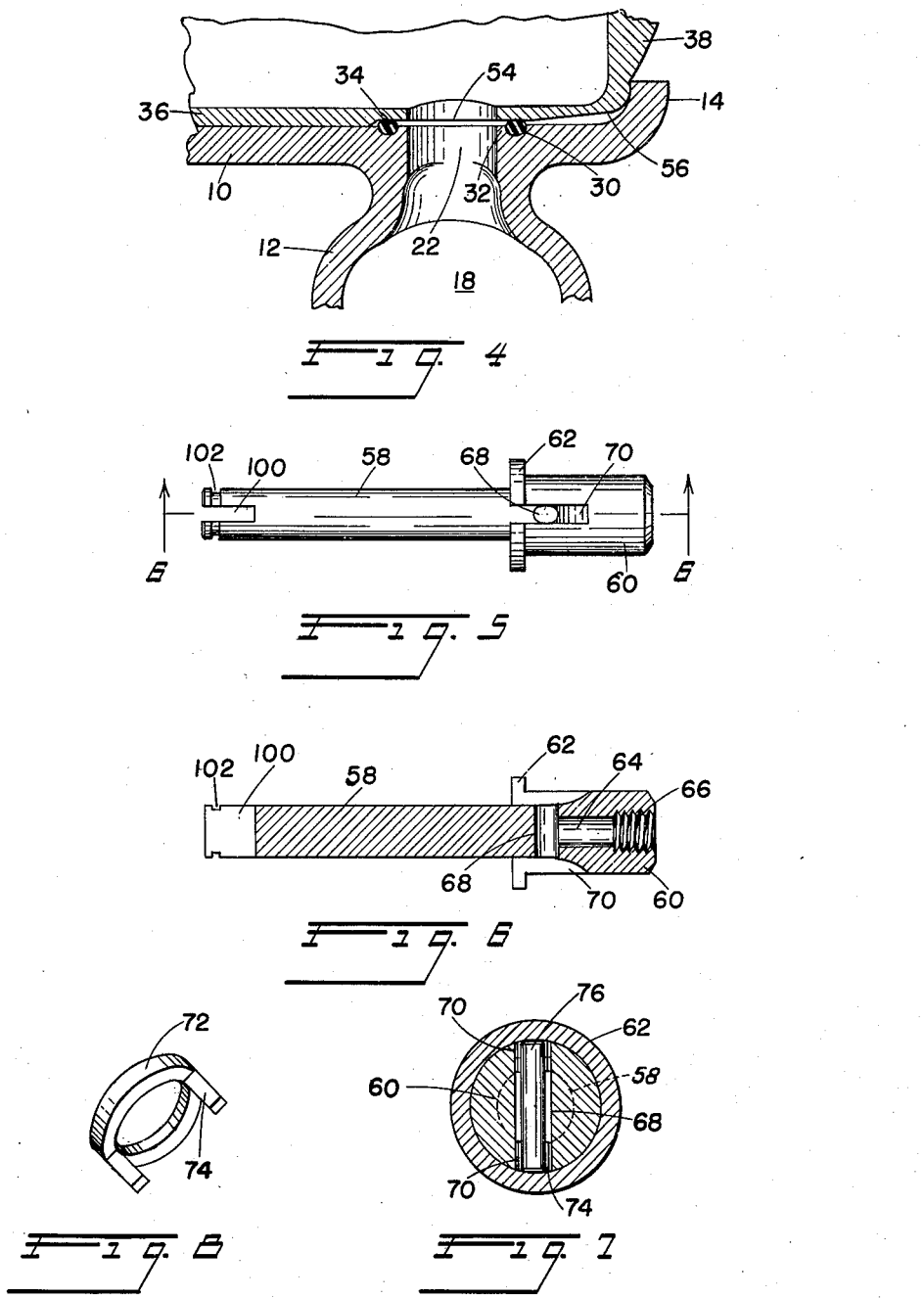

Patented Feb. 10, 1953

2,627,848

UNITED STATES PATENT OFFICE 2,627,848

LIGHT WEIGHT ROTARY FLUID METER AND REGISTER DRIVE ASSEMBLY

William I. Smith, Wilkinsburg, Pa., assignor to Rockwell Manufacturing Company, Pittsburgh, Pa., a corporation of Pennsylvania Application January 14, 1947, Serial No. 721,976

6 Claims. (Cl. 121—93)

This invention relates to fluid meters and more particularly to a meter of the rotary type, capable of high efficiency, sustained operation at high pressures and through a wide range of temperatures.

The present invention is primarily designed to provide a light-weight rotary fuel meter which meets the exacting demands of the aviation industry, especially for use in conjunction with jet-propelled aircraft. In such cases, fuel injection takes place at inordinately high pressures; the position with respect to the horizontal is infinitely variable; and large fluctuations of temperature occur at short time intervals. When travelling at such high rates of speed, it is essential that an accurate indication of fuel consumption shall be available to the pilot at all times. Excessive accelerations to which all parts of a so rapidly moving body may be subjected, make it imperative that said parts shall possess maximum ruggedness and strength. At the same time, in order that the aircraft shall have the required buoyancy, the weight of accessory equipment and the space occupied thereby are decisive factors in the selection of such units.

Insofar as I am advised, prior to the development of the present invention, there has not been available to the aviation industry a dependable, high capacity fuel meter having the essential requisites of lightness, strength, compactness and unfailing accuracy of measurement under high pressure and sudden severe fluctuations of temperature. Accordingly, it is the general object and purpose of the present invention to provide certain novel features of construction and assembly, resulting in a low cost, high efficiency aircraft fuel meter in which the above noted essentials have been practically embodied.

It is one of the more important objects of the invention to provide a fluid meter of the rotary type having externally accessible means for quickly effecting a proper adjustment of the rotor to establish the required close clearance relation between the rotor and relatively stationary cooperating parts, in order to insure efficient operation.

Another object of the invention resides in the provision of an integrally cast meter casing and manifold of aluminum alloy or other light-weight metal, together with an inner cylindrical liner of steel or other material selected for strength, in which the meter rotor is journalled by means enabling the liner and rotor to be easily and quickly assembled as a unit within the meter casing or removed therefrom.

A still further important object of the invention is to provide means rendered automatically effective by the insertion of the liner cylinder within the outer meter casing to produce a fluid-tight seal between the liner and casing walls around registering inlet and outlet flow ports in said walls.

An additional object of the invention resides in the provision of a fluid meter as above characterized, in which the desired results are practically achieved with the use of a minimum number of cooperating parts of simple and durable structural form, which may be replaced at nominal cost so that maintenance expense will be reduced to a minimum.

With the above and other subordinate objects in view, the invention comprises the improved fluid meter, and the construction and relative arrangement of its several elements, as will hereinafter be more fully described, illustrated in the accompanying drawings and subsequently incorporated in the subjoined claims.

In the drawings, wherein I have disclosed one simple and practical embodiment of the invention, and in which similar reference characters designate corresponding parts throughout the several views:

Figure 1 is a vertical longitudinal section showing one embodiment of my improved meter and illustrating a preferred form of register drive mechanism operatively connected therewith;

Figure 2 is a transverse sectional view taken substantially on the line 2—2 of Figure 1, the rotor being omitted;

Figure 3 is a fragmentary longitudinal section through the meter casing wall showing the liner cylinder in elevation and illustrating the means formed upon the external peripheral surface thereof for distorting and compressing the sealing rings around the fluid flow ports;

Figure 4 is a detail sectional view on an enlarged scale, taken substantially on the line 4—4 of Figure 2;

Figure 5 is a detail plan view of the rotor supporting shaft;

Figure 6 is a longitudinal section taken substantially on the line 6—6 of Figure 5;

Figure 7 is a transverse sectional view taken substantially on the line 7—7 of Figure 1; and Figure 8 is a detail perspective view of the rotor adjusting collar.

In the embodiment of the invention which I have selected for purposes of illustration, the meter casing 10 and manifold 12 may be formed as a single integral casting from aluminum alloy or other comparatively light-weight metal. The wall of the casing 10 at one of its ends is formed with an inwardly extending annular flange 14 and has an inner cylindrical surface of substantially uniform diameter extending from this flange to the opposite open end of the casing.

The manifold 12 at the lower side of the meter casing is formed with oppositely extending inlet and outlet passages 16 and 18 respectively, in communication with the fluid flow ports 20 and 22 respectively, in the wall of the casing 10. Fluid under pressure is conveyed through a suitable conduit (not shown) connected with inlet passage 16 from a pump or other source of supply, and from the meter through a similar conduit connected with the passage 18 to the point of utilization. Radially of the meter casing and between the passages 16 and 18, an opening 24 is formed through the manifold 12 for a purpose which will be later explained.

Diametrically opposite to each of the ports 20 and 22, the wall of casing 10 is provided with openings 26 and 28 respectively, and through these openings by means of a suitable tool, a trepanning operation may be trans-axially performed to cut a continuous groove 30 in the inner cylindrical face of the casing in accurately concentric relation to the respective ports. Preferably, these grooves are of such depth and width as to leave a comparatively narrow annular shoulder 32 between said grooves and the respective ports 20 and 22. While the grooves 30 are cut in a concave surface, the base wall of each groove lies in a single plane obliquely inclined relative to a central vertical plane axially bisecting the meter casing. Therefore, it will be seen that when sealing rings 34 having a diameter slightly exceeding the maximum groove depth, are placed in the grooves 30, they will normally project above the open sides of said grooves and the shoulders 32. The sealing rings 34 are preferably of synthetic rubber or other suitable elastically deformable material, and it will become evident, as this description continues, that the accurate cutting of the grooves 30 is of important practical significance in effecting a fluid-tight seal in the manner to be presently described.

A cylindrical liner 36 of steel or other material having the required strength and physical characteristics, is provided for the meter casing 10. The cylindrical wall of this liner is of such external diameter that it will have intimate face-to-face contact with the internal cylindrical surface of the casing 10 when inserted therein. The liner 36 has a relatively thick wall 38 closing one end thereof and formed with an inwardly and outwardly projecting hub portion 40 provided with an axial bore 42. An external flange 44 extends partially around the other open end of the liner 36, providing a shoulder 46 for contact with the wall of the casing 10 at the open end thereof.

The cylindrical wall of the liner 36 is also provided with circumferentially spaced ports or openings 48 and 50 of approximately the same diameter as the ports 20 and 22 in the wall of casing 10, with which they are respectively adapted to register. A relatively small diameter opening 52 is also formed in the liner wall between the openings 48 and 50, and is adapted to register with the opening 24 in the manifold 12.

Referring now to Figure 3 of the drawings, it will be noted that surrounding each opening 48 and 50, the cylindrical wall of the liner 36 is externally provided with circumferentially spaced, longitudinally extending flat rectangular surfaces 54 merging with the cylindrical surface of the liner at one of their ends, and a flat surface 56 of essentially trapezoidal shape extends from the other end of each surface 54 and is inclined with respect to the latter surface toward the axis of the liner. Surfaces 56 preferably extend to the point where the external cylindrical surface of liner 36 merges into the external surface of the end wall 38. The increased thickness of the latter wall compensates for the slight decrease in thickness of the cylindrical liner wall resulting from the formation of the surfaces 54 and 56, so that the structural rigidity and strength of the cylindrical liner wall is not seriously impaired.

From the above description, it will be apparent that having first placed the sealing rings 34 in grooves 30 of the outer casing wall, when liner 36 is pressed into the casing with the openings 48 and 50 thereof in accurate alignment with the ports 20 and 22 respectively, the parts of said rings projecting from the open sides of the grooves lie in a plane substantially parallel with the planes of the respective flat surfaces 54 on the cylindrical liner wall. The inclined extended surfaces 56 on said liner wall first engage the projecting parts of the sealing rings 34 and exert a wedging action thereon to elastically distort and progressively compress said rings within the grooves 30, so that in the final inserted position of the liner in contact with casing flange 14, the distorted sealing rings will have firm intimate contact with the surfaces 54 of the liner and with the walls of the grooves 30 at all points around the openings 48 and 50 and ports 20 and 22. In this manner, there is automatically produced, upon insertion of the liner within the outer casing of the meter, a positive and highly effective seal around each of the fluid ports, preventing any possibility of leakage between the casing 10 and liner 36, and without material resistance to the quick assembly of the liner within the outer casing or its removal therefrom.

I have also provided a novel means for operatively mounting the meter rotor within the liner 36 for assembly as a unit with the latter within the outer casing 10, together with externally accessible means for adjusting the axial position of the rotor in the required minimum clearance relation to relatively stationary parts, for most efficient operation. This feature of the invention will now be described in connection with Figures 1 and 5 to 8 inclusive of the drawings.

A rotor supporting shaft 58 has a diametrically enlarged end portion 60 rigidly held in the bore 42 of the liner hub 40 with a driving fit. At its inner end this enlarged portion 60 of the rotor shaft terminates in an external annular flange 62. A bore 64 in the shaft portion 60 has an outer threaded end portion 66. At its inner end, this bore is intersected by the opening 68 extending diametrically through the shaft. This opening at its opposite ends is in communication with longitudinal slots or grooves 70 cut into the enlarged section 60 of the shaft and through the flange 62 thereof. These grooves have a major depth extending to the circumference of the small diameter section of the shaft 58.

At the inner side of the flange 62, a collar 72 loosely surrounds the shaft 58 and is provided with diametrically opposite parallel arms 74 of rectangular cross section projecting from one side thereof and extending into the grooves or slots 70 in the shaft section 60. It will be evident from Figure 1 that, with the flange 62 in close abutting contact against the inner end of hub 40, the portions of grooves 70 in shaft section 60 are within the bore 42 of said hub. A pin 76 of smaller diameter than the opening 68 has limited movement in said opening axially of the shaft, with the end portions of said pin extending into the grooves 70 and in contact with the ends of arms 74 on the collar 72.

An adjusting screw has a threaded section 78 adjustably engaged with the threaded outer end 66 of bore 64, and an unthreaded section 80 axially movable in said bore in bearing contact against the central portion of the pin 76. The inner end of screw portion 80 is provided with an annular groove to receive a sealing ring 82, said screw at its outer end having a kerf or slot indicated at 84, to receive a suitable adjusting implement. The end of shaft section 60 and screw section 78 are within the bore 42, and after said screw has been adjusted, a circular lock nut 86 of slightly less diameter than said bore is threaded upon the end of the screw and against the end face of shaft section 60, whereby said screw is securely locked in adjusted position.

The rotor is preferably of the rotary vane type, one example of which is disclosed in Patent No. 2,274,206, issued to W. H. Marsh on February 24, 1942. As shown in Figure 1 of the drawings, this rotor essentially comprises a body member 88 having a plurality of circumferentially spaced recesses or pockets for the rotary vanes, one of which is indicated at 90. The rotor vane shafts 92 are journalled in the side members 94 which are rigidly secured to opposite sides of the body 88 by suitable bolts 96.

The rotor is supported for free rotation upon the fixed shaft 58 by spaced anti-friction bearings 98 axially slidable on said shaft. The end of the shaft at the open side of the meter housing is provided with a slot 100 and a circumferential peripheral groove 102. A sun-gear 104 is non-rotatably mounted on shaft 58 by means of the pin 106 extending through the slot 100. Outward axial movement of said gear on the shaft is limited by the stop ring 108 in the groove 102 and is normally urged to this position by means of the spring 110 surrounding shaft 58 between said gear and one of the rotor bearings 98. This spring also urges said bearings and the rotor inwardly on the shaft, maintaining the other bearing 98 in contact with the collar 72.

In the assembly of the rotor upon the shaft 58, a division plate 112 is placed between the opposite side members 94 of the rotor and extends between the openings 48 and 50 in the wall of the casing liner 36 (see Patent 2,274,206). This division plate is provided with a central threaded opening, which registers with opening 52 in the liner wall, and with an annular groove containing a sealing ring 114 surrounding said opening at the inner face of the liner wall. It will thus be apparent that when the clamping bolt 116 is inserted through the aligned openings 24 and 52 in the manifold and casing liner and threaded into the division plate 112, the latter is tightly clamped against the inner face of the liner between the opposite sides of the rotor and sealing ring 114 is placed under compression to effectively prevent leakage of fluid between the division plate and liner.

The sun gear 104 is in constant mesh with idler gears suitably mounted upon one side member 94 of the rotor, one of said gears being shown at 118. These idler gears in turn are in constant mesh with adjacent gears 120 fixed to one end of the vane shafts 92. Thus, as the rotor revolves, uniform rotation is transmitted to the several vanes within the rotor pockets so that the vanes will be properly positioned to pass over the division plate 112 and avoid resistance to free rotation of the rotor under the fluid pressure force acting on said vanes.

It will be apparent from the above description that the rotor and division plate 112 may first be assembled within the casing liner 36, and then inserted as a unit with said liner within the outer casing 10, until the end wall 38 of the liner abuts the inner face of the casing flange 14, when sealing rings 34 will have been compressed to establish fluid-tight seals between the casing and liner walls around the ports 20 and 22 in the manner previously explained. Clamping bolt 116 is then applied to rigidly secure the division plate to the inner face of the liner wall as above described.

The rotor may be axially adjusted on the shaft 58 at any time during operation and externally of the rotor casing by means of adjusting screw 78. Thus when said screw is threaded inwardly in the end of shaft 58, pin 76 is moved axially of the shaft in opening 68 to thereby axially move collar 72 on the shaft, which in turn shifts the rotor axially against the resistance of spring 110. In this manner, the rotor may be accurately adjusted to maintain the necessary clearance between the side members 94 of the rotor and the side faces of division plate 112 for maximum operating efficiency under all conditions.

While any desired drive means for the meter register may be employed, I preferably provide a register drive of the magnetic type, enclosed within a housing member 122, provided at its open end with an external flange 124 for abutting contact with a shoulder 126 internally formed on the flange 44 of the liner 36. Member 122 is detachably locked in assembled position by ring 125 seated in an internal groove in flange 44 at the outer side of flange 124. Inwardly of said flange 124, the housing wall has an external groove containing ring 128 in fluid sealing contact with the inner surface of the liner wall.

The annular driving magnet 130 is suitably mounted in a carrier 132 connected in dynamically balanced relation with the meter rotor. As herein shown, certain of the rotor assembly bolts 96 are relatively long and provided with threaded bores receiving attaching screws 134 inserted through apertured ears or lugs on one end of the magnet carrier 132.

The magnet 130 and carrier 132 surround a thin-walled shell or cup 136 in close clearance relation therewith. This cup at its open end circumscribes a boss 140 on the end wall of housing member 122 and has a fixed connection therewith. The boss 140 has a peripheral groove containing sealing ring 142, whereby leakage of fluid to the interior of the cup is effectively precluded. This cup encloses the driven magnet 144 having a suitably fixed connection to one end of shaft 146 journalled in the end wall of housing member 142. The outer end of this shaft is connected by a reduction gear train 148 to the register driving shaft 150. The register dial may be calibrated to translate the revolutions of the meter rotor in terms of the quantity of fuel consumed or the quantity remaining in the fuel tank or reservoir.

From the foregoing description considered in connection with the accompanying drawings, the several novel features of the present invention may be clearly understood, and it will be seen that I have provided a rotary type fluid meter having a housing structure for the rotor which is of great strength, without undue bulk and weight. The construction of the novel casing liner and the mounting of the rotor therein make it possible to provide a light, compact and accurate fluid meter of maximum stability, which will withstand high pressure without deformation or failure. It is therefore admirably adapted for use in jet-propelled airplanes or other aircraft where such equipment is subject to unusually severe stresses and the effects of sudden changes in temperature. The easy and quick assembly or disassembly of the outer casing and liner and rotor unit, enabling ready access to be had to the various parts when replacement is required, is also an important practical feature of the invention, together with the means rendered automatically effective in the assembly of the casing and liner, to provide a positive and reliable barrier to the leakage of fluid around the inlet and outlet ports between the liner and casing walls. It will also be noted that the several cooperating parts are of rugged structural form and will not be functionally affected by vibration, thus insuring consistently efficient operation of the meter in all positions which the aircraft may assume with respect to the horizontal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Housing structure for rotary type fluid meters comprising an outer light-weight casing, a high pressure resistant cylindrical liner insertable axially within the casing in frictional face-to-face contact with the wall thereof, the casing and liner walls intermediate of their ends having circumferentially spaced registering inlet and outlet ports, said casing wall having an internal annular groove concentrically surrounding each port, an elastic sealing ring in each of said grooves having a normal diameter exceeding the depth of the groove, and said liner wall having external surface portions longitudinally aligned with each port therein and inclined toward the rotor axis in the direction of insertion of the liner to engage the said rings in the insertion of the liner within the casing and first progressively distort and compress the sealing rings into said grooves and then maintain said rings under substantially uniform compression in the final port-registering position of the liner to establish fluid-tight seals between the liner and casing walls around the respective ports.

2. The fluid meter housing structure as defined in claim 1 wherein said liner has a relatively thick end wall and said external surface portions aligned with each port include a substantially rectangular flat area surrounding the port and a substantially trapezoidal flat area extending in an inclined plane from said rectangular area toward the liner axis and merging into the end wall of the liner.

3. In a fluid meter, a casing, a liner secured within said casing and having a cylindrical inner periphery, a rotor within said lining having a body and side members on opposite sides of said body, a plurality of rotatable vanes on the periphery of said body between said side members cooperating with said liner periphery during rotation of the rotor, a division plate assembly secured tightly upon the inner liner periphery and radially projecting into coaction with said rotor between said side members, inlet and outlet ports extending in circumferentially spaced relation through the casing and liner at opposite sides of said division plate assembly, annular recesses in the casing surrounding said ports and resilient rings in said recesses compressed between the casing and liner for preventing leakage of fluid from said ports between the casing and liner.

4. In a fluid meter, a cylinder closed at one end and open at the other, a rotor comprising a body having spaced side members mounted within said cylinder adjacent said closed end, spaced movable vanes on the periphery of said body and disposed between said side members cooperating with the internal periphery of said cylinder during rotation of the rotor, a division plate assembly fixed in fluid tight assembly upon the internal periphery of said cylinder and projecting into coaction with said rotor body between said side members, a fluid tight cover secured across the open end of said cylinder and having a central internal chamber, a register drive magnetic coupling element mounted in said chamber, a magnetically permeable but fluid tight shell mounted on the inner side of said cover about said coupling element, a cooperating annular magnetic coupling member within the cover surrounding said shell, and a carrier for said annular magnetic coupling member fixed to said rotor and projecting axially therefrom.

5. In the fluid meter defined in claim 4, said vanes being rotatable and each carrying a gear on the side adjacent said cover, a centrally disposed rotatable sun gear, and a plurality of idler gears meshed with said vane gears and said sun gear, said idler gears being supported at opposite ends in said carrier and the adjacent rotor side member.

6. In a fluid meter, a cylinder having circumferentially spaced inlet and outlet ports in its periphery, a rotor rotatably mounted in said cylinder comprising axially spaced side members having running clearance with the inner periphery of said cylinder, a plurality of relatively movable peripheral vanes shiftably mounted on said rotor and extending between said side members, said vanes interfitting and coacting with the inner periphery of said cylinder and said side members to provide closed fluid chambers during rotation of said rotor, a division plate assembly rigidly mounted on said inner periphery of the cylinder and projecting between said rotor side members into running clearance with said rotor and with opposed faces having sliding running fit with said side members, said division plate being located between said ports, a surrounding casing within which said cylinder is slidably and snugly fitted having inlet and outlet ports corresponding to those of said cylinder, annular recesses in said casing surrounding said ports, resilient O-rings in said recesses compressed between said casing and cylinder to prevent leakage of fluid from said ports between the casing and cylinder, and cooperating parts on said cylinder and said casing for removably locking said cylinder against axial displacement on said casing with the inlet and outlet ports respectively of said cylinder and casing in accurately registering relation.

WILLIAM I. SMITH.

REFERENCES CITED

The following references are of record in the file of this patent:

UNITED STATES PATENTS

| Number | Name | Date |
|---|---|---|
| 280,322 | Nash | June 26, 1883 |
| 1,322,107 | Gressle et al. | Nov. 18, 1919 |
| 1,608,231 | Bradley | Nov. 23, 1926 |
| 1,724,873 | Ford | Aug. 13, 1929 |
| 2,103,180 | Rice | Dec. 21, 1937 |
| 2,132,812 | Wahlmark | Oct. 11, 1938 |
| 2,185,812 | Jimerson | Jan. 2, 1940 |
| 2,207,182 | Smith | July 9, 1940 |
| 2,248,030 | Zwack | July 1, 1941 |
| 2,337,897 | Jimerson | Dec. 28, 1943 |
| 2,394,120 | Tucker | Feb. 5, 1946 |
| 2,401,190 | Reynolds | May 28, 1946 |
| 2,454,006 | Plummer | Nov. 16, 1948 |